United States Patent [19]

Walter et al.

[11] Patent Number: 5,141,594

[45] Date of Patent: Aug. 25, 1992

[54] SEALING TOOL FOR HEAT-SEALING A PULL-OFF LID ONTO A CONTAINER

[75] Inventors: Juris Walter, Schaffhausen; Hans-Rudolf Nägeli, Neuhausen am Rheinfall, both of Switzerland

[73] Assignee: Alusuisse-Lonza Services Ltd., Zurich, Switzerland

[21] Appl. No.: 616,368

[22] Filed: Nov. 20, 1990

[30] Foreign Application Priority Data

Nov. 29, 1989 [CH] Switzerland ............... 4264/89

[51] Int. Cl.⁵ .............................................. B30B 15/06
[52] U.S. Cl. .................................. 156/581; 53/374.8; 156/583.1
[58] Field of Search ............ 156/581, 583.1, 69; 53/374.3, 374.8; 220/266, 270, 276

[56] References Cited

U.S. PATENT DOCUMENTS

| | | | |
|---|---|---|---|
| 4,079,570 | 3/1978 | Rucker | 53/374.8 |
| 4,948,441 | 8/1990 | Peck | 156/581 |
| 4,961,513 | 10/1990 | Gossedge et al. | 156/69 |
| 4,969,965 | 11/1990 | Matty et al. | 156/69 |

FOREIGN PATENT DOCUMENTS

| | | | |
|---|---|---|---|
| 0015885 | 9/1980 | European Pat. Off. | |
| 0203032 | 11/1986 | European Pat. Off. | |
| 0344340 | 12/1989 | European Pat. Off. | 156/581 |
| 2340393 | 9/1977 | France | 156/581 |
| 0006377 | 1/1978 | Japan | 156/581 |

*Primary Examiner*—Michael W. Ball
*Assistant Examiner*—Steven D. Maki
*Attorney, Agent, or Firm*—Bachman & LaPointe

[57] ABSTRACT

A sealing tool for heat-sealing a pull-off lid (1) with a tearing-open tab (13) onto a container (4) comprises an upper sealing jaw (5) and a lower sealing jaw (6). The upper sealing jaw (5) is equipped, in the region of the tearing-open tab (13), with recesses (11) which start from the edge (10) of the pressure surface (9) making the sealing seam and which extend over the smaller part of the width of the pressure surface (9).

11 Claims, 6 Drawing Sheets

5,141,594

SEALING TOOL FOR HEAT-SEALING A PULL-OFF LID ONTO A CONTAINER

BACKGROUND OF THE INVENTION

The invention relates to a sealing tool for heat-sealing a pull-off lid onto a container, a tearing-open tab for pulling the lid off by hand being formed on the lid.

With pull-off (peelable) lids for sterilizable and reheatable containers made of barrier plastic or another composite material containing aluminum (for example, STERALCON trays), for example for foodstuffs, problems arise as a result of contradictory requirements. Steralcan is a registered trademark of Alusuisse Swiss Aluminium Ltd. On the one hand, very firm seals must be obtained, in order to withstand the high internal pressures occurring during sterilization and, above all, during reheating in a water bath. On the other hand, the lid should be easy to open by hand.

To obtain the good closing properties mentioned, high sealing temperatures and sealing pressures have to be used during the closing. This leads to so-called sealing fold-back, especially in a sealing layer located on the underside of the lid, specifically both on the container inside and on the container outside. Such sealing fold-back on the inside of the container on the one hand improves the closure safety and is thoroughly desirable; on the other hand, however, it results in excessively high tearing-open forces during the pulling off (peeling), which make tearing open much more difficult and sometimes even impossible.

SUMMARY OF THE INVENTION

The object on which the invention is based is to provide a sealing tool which allows a pull-off lid to be attached to a container by means of a sealing seam which is of sufficient strength and which at the same time can easily be pulled off.

To achieve this object, in a sealing tool of the type mentioned, at least one sealing jaw of the sealing tool is equipped, at least in the region of the tearing-open tab, with recesses which start from the edge of the pressure surface making the sealing seam and which extend over some of the width of the pressure surface.

By means of a sealing tool according to the invention, the sealing fold-back is interrupted, preferably in the region of the tearing-open tab or, on round containers, over the entire container circumference, by noses corresponding to the recesses in the sealing tool. The opening tear is therefore no longer made over the entire length of the sealing fold-back, but now only in the smaller regions of the noses. The tearing-open forces consequently decrease to values which allow an easy tearing open by means of the tearing-open tab and thus an easy pulling off of the lid from the container.

The recesses can be designed in various forms. Recesses in the form of conical points, advantageously made by milling, are the simplest to produce and are at the same time highly effective. These recesses should extend at most over half the width of the pressure surface of the sealing tool.

Although recesses should in any case start from the outer edge of the sealing tool, recesses starting from the inner edge can additionally also be provided, specifically especially when the inner sealing fold-back is not important. This embodiment of the sealing tool makes the tearing open easier at both sealing edges and additionally prevents the delamination tendency when the lid is formed from a composite material with a low laminating adhesion.

BRIEF DESCRIPTION OF THE DRAWINGS

The invention is explained in more detail below, with further particulars, by means of an exemplary embodiment and with reference to diagrammatic drawings.

DETAILED DESCRIPTION

Figure 1:
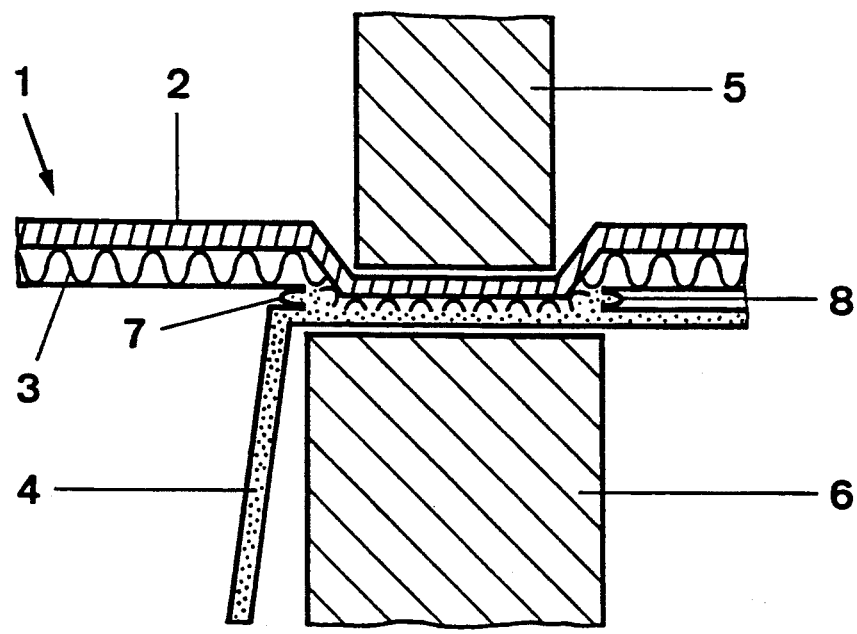
FIG. 1 shows a partial cross-section through a container with a lid during the sealing operation using a conventional sealing tool with an upper and a lower sealing jaw.

According to FIG. 1, a lid 1 is formed from an aluminum foil 2 laminated with a sealing layer 3 and is placed onto a container 4 consisting, for example, of plastic. The edge region is shown gripped between an upper conventionally electrically heated sealing jaw 5 and a lower sealing jaw 6 of a sealing tool. By means of the pressure and temperature between the upper sealing jaw 5 and the lower sealing jaw 6, the layers 3 and 4 are softened and somewhat compressed and thus, with the inner and outer sealing fold-back 7 and 8, form the sealing seam.

The pressure surface, making the sealing seam, of the upper sealing jaw 5 is designated by 9.

Figure 2A:
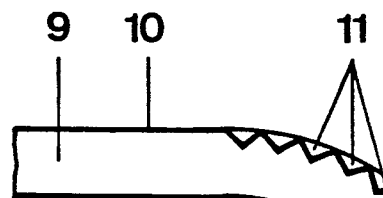
FIGS. 2a, 2b and 2c show bottom views of the pressure surface, making the sealing seam, of three differently designed upper sealing jaws of a sealing tool.

According to FIG. 2a, conical recesses 11 are milled into the outer edge 10 of the upper sealing jaw 5 of a sealing tool according to the invention and, starting from the outer edge 10, taper in the direction of width of the pressure surface 9. The recesses 11 extend over less than half the width b of the pressure surface 9.

Figure 2B:
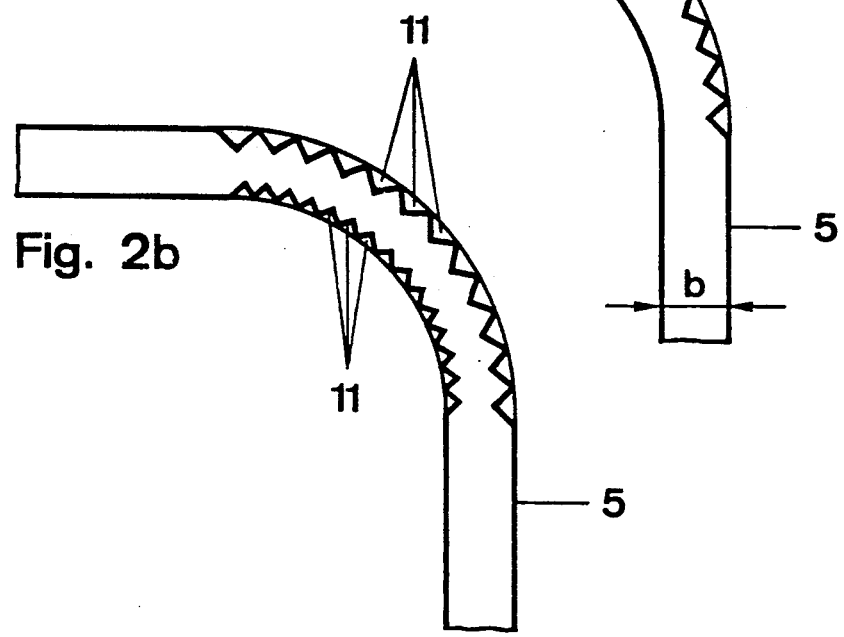

In the version according to FIG. 2b, conical recesses 11 are additionally formed on the inner circumference of the sealing jaw 5.

Figure 2C:
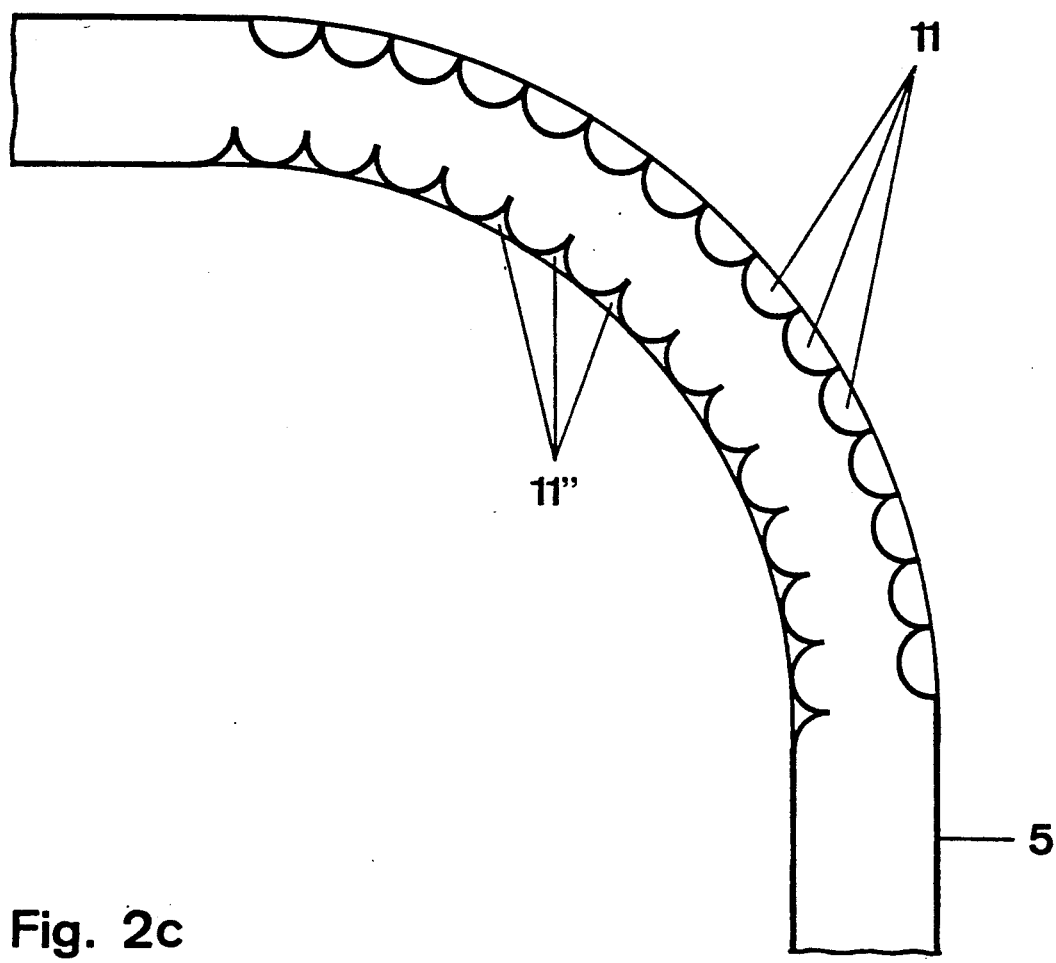
Figure 5A:
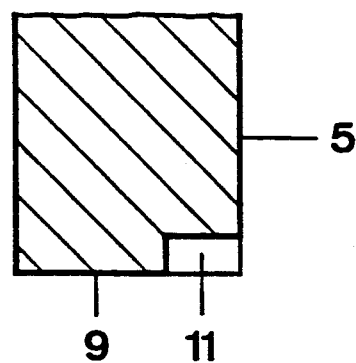
FIGS. 5a to 5d show partial cross-sections of differently designed sealing tools according to the invention.
Figure 5B:
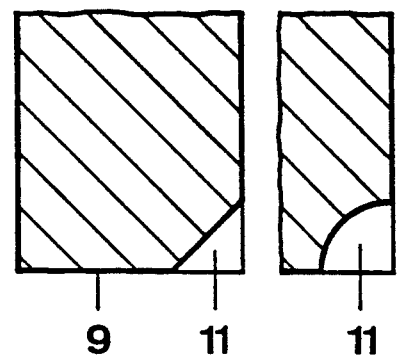
Figure 5C:
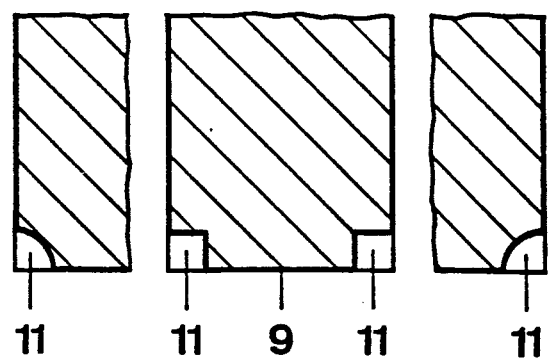

In the version according to FIG. 2c, the recesses 11 are semicircular on the outer circumference (in the form of a quarter circle in the cross-section of the jaw 5 according to FIGS. 5b and 5c) and on the inner circumference are likewise semicircular with a "negative" profile 11''.

Figure 4:
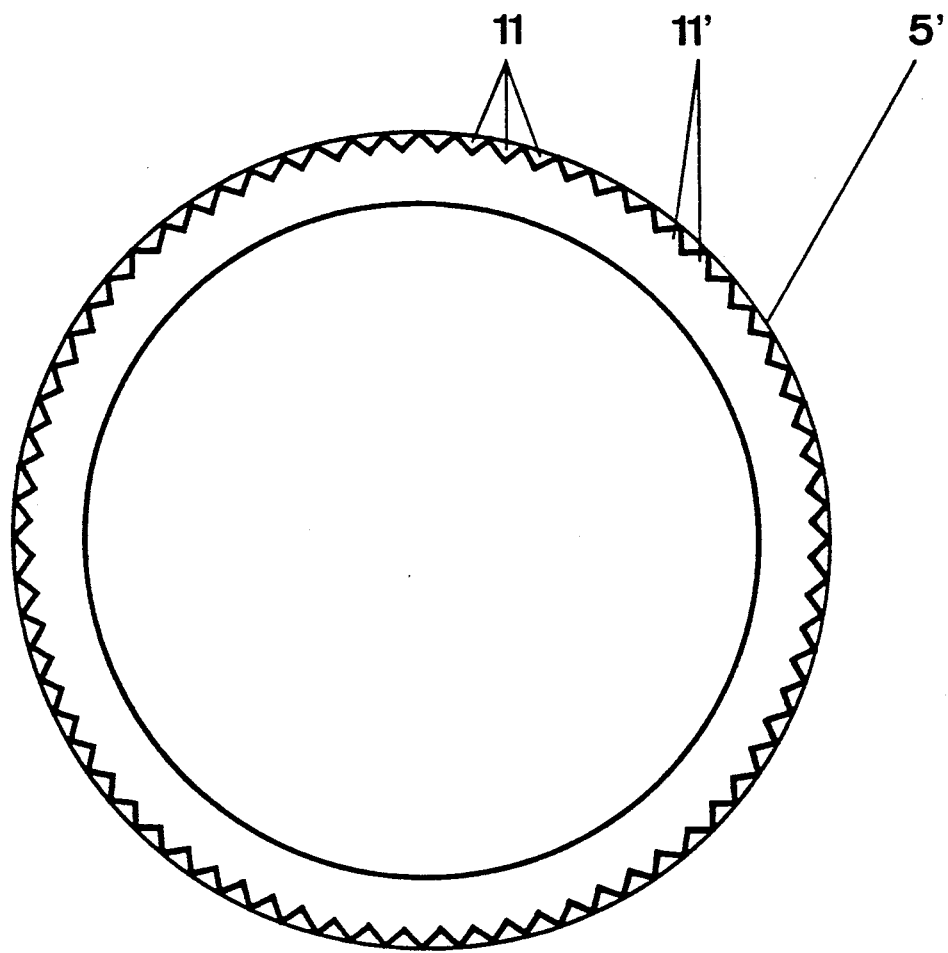
FIG. 4 shows a bottom view of a sealing jaw of a sealing tool according to the invention for a round container.

This produces an outer sealing fold-back 8 which extends not in the circumferential direction, but on the contrary along the edges of the milled recesses 11 and which thus opposes less resistance to a tearing open than a circumferentially continuous sealing fold-back 8 according to the state of the art. In the design according to the invention, many small sealing noses or sealing points 11' are formed, according to FIGS. 3 and 4, in the region of the tearing-open tab which is designated by 13 in FIG. 3 and which is arranged at one corner.

Where a round container produced by means of a sealing jaw 5' according to FIG. 4 is concerned, such a tearing-open tab can be provided at any location on the circumference, but in the region of the sealing points 11" impressed by the sealing tool according to the invention.

EXAMPLE

Figure 3:
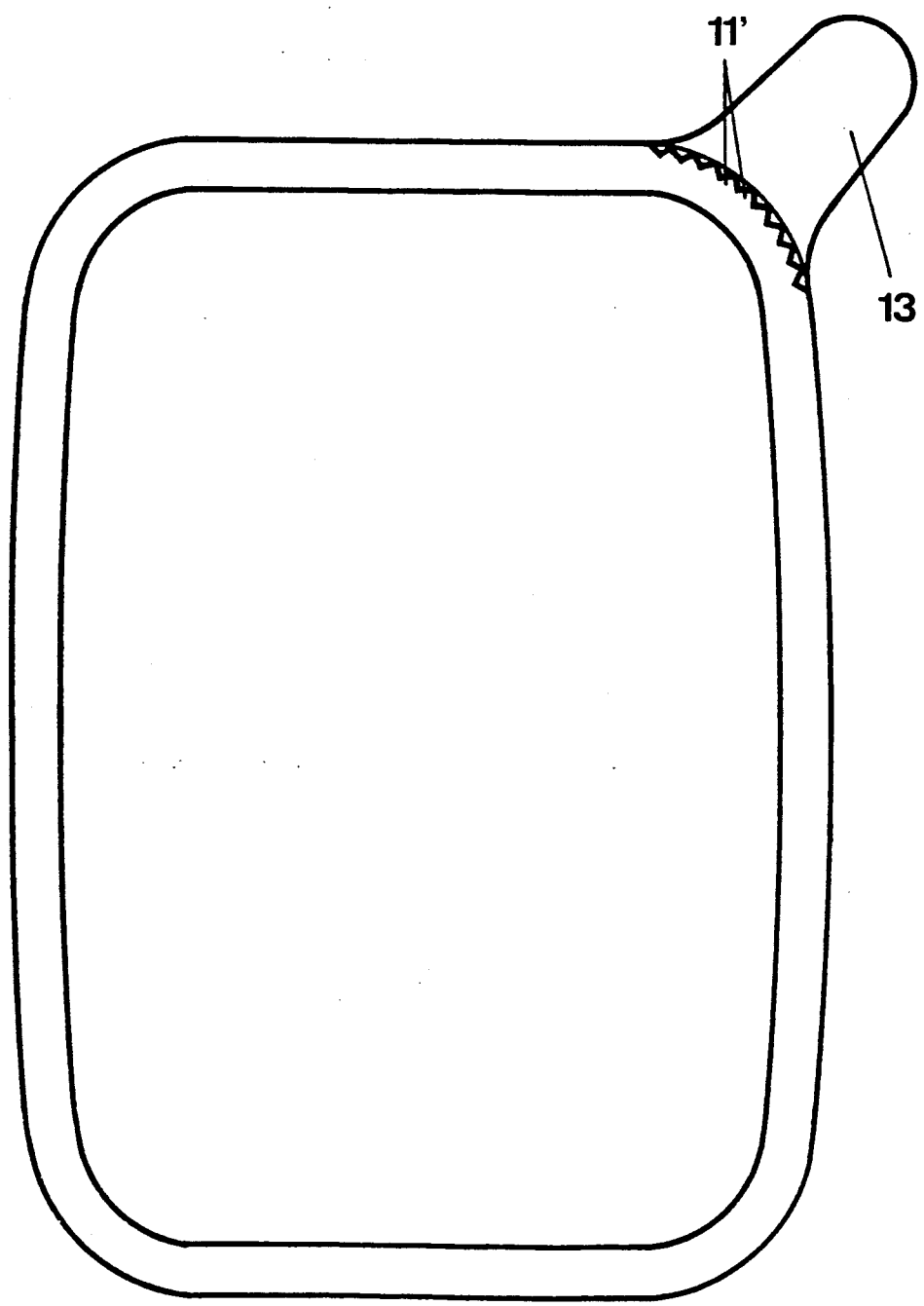
FIG. 3 shows a top view of an essentially rectangular container with rounded corners which is produced by means of a correspondingly shaped sealing tool according to the invention.

In an executed construction according to FIG. 3, the reduction of the tearing-open force as a result of the serrated design of the sealing tool was measured in the region of the tearing-open tab.

MEASUREMENT 1

| Sealing: | Radius without recesses | |
|---|---|---|
| | Tearing-open force: | 53 N |
| | Tear propagation force: | 20 N |
| Sealing: | Radius with recesses (serrated geometry) | |
| | Tearing-open force: | 25 N |
| | Tear propagation force: | 20 N |

Figure 5D:
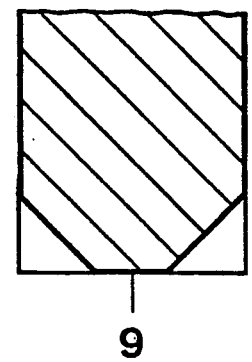

FIGS. 5a to 5d, in the form of partial cross-sections through the particular upper sealing jaw 5, show different forms of the recesses 11, namely rectangular in FIG. 5a, triangular and in the form of a quarter circle in FIG. 5b, rectangular on both sides and in the form of a quarter circle in FIG. 5c and triangular on both sides in FIG. 5d.

Figure 6:
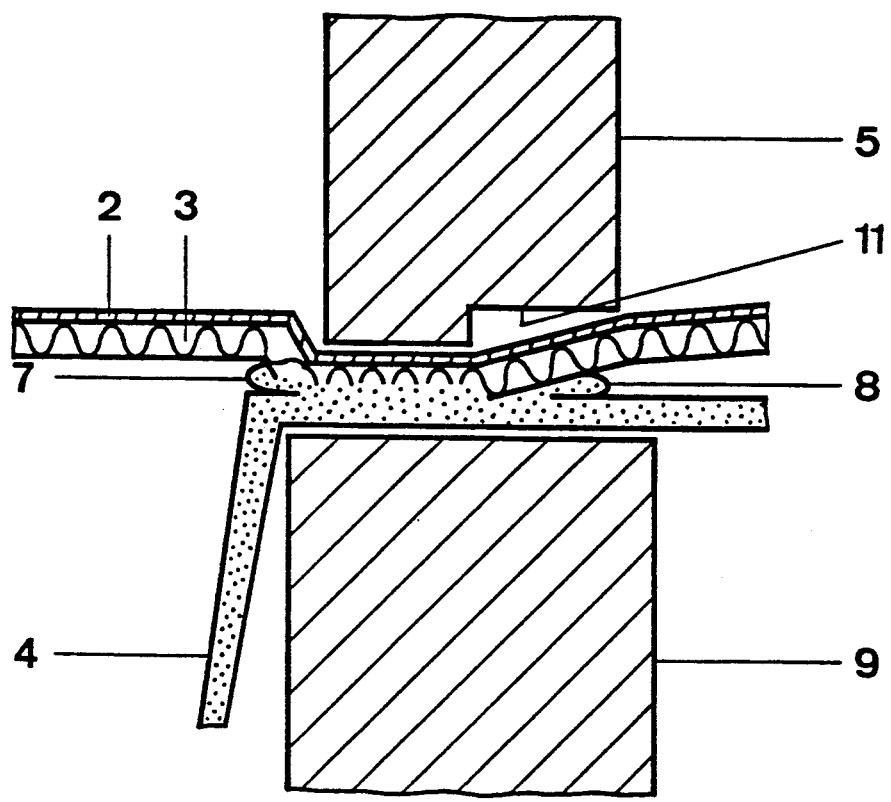
FIG. 6 shows a cross-section through a container with a lid during sealing by means of a sealing tool according to the invention.

FIG. 6, in a representation corresponding to that of FIG. 1 (parts bearing the same reference symbols are not described again), illustrates the sealing operation using a sealing tool according to the version of the invention shown in FIG. 5a, with recesses 11 of rectangular cross-section only on the outside of the upper sealing jaw 5. An outer sealing fold-back 8 is formed here too, but it follows the path of the serrated edge of the recesses 11 and thus opposes lower resistance to a subsequent tearing-open operation.

We claim:

1. Sealing tool for heat-sealing a pull-off lid onto a container to form a sealing seam between the container and the lid, said lid including a tearing-open tab for pulling the lid off by hand, which comprises a sealing tool having sealing jaws with essentially flat pressure surfaces thereon, each of said essentially flat pressure surfaces having inner and outer edges and a width for making the sealing seam, at least one sealing jaw being equipped, at least in the region of the tearing-open tab portion of said lid, with recesses which start from the outer edge of the pressure surface of said at least one sealing jaw and which extend less than half of the width of the pressure surface, said tool operative to heat seal said pull-off lid with said tearing-open tab onto the container and to permit easy opening thereof.

2. Sealing tool according to claim 1 wherein the recesses, starting from the edge, taper conically.

3. Sealing tool according to claim 1 wherein the recesses start both from the outer edge and from the inner edge of said at least one sealing jaw.

4. Sealing tool according to claim 1 wherein the recesses are formed by milling cuts.

5. Sealing tool according to claim 1 wherein said tool has an upper sealing jaw acting on the lid and a lower sealing jaw and the recesses are formed solely in said upper sealing jaw acting on the lid.

6. Sealing tool according to claim 1 wherein the recesses are formed round an entire circumference of said at least one sealing jaw.

7. Sealing tool according to claim 1 wherein said container is plastic and said lid is formed of an aluminum foil laminated with a sealing layer and wherein the recesses are formed solely in one sealing jaw acting on said lid.

8. Sealing tool according to claim 1 wherein said recesses are semi-circular.

9. Sealing tool according to claim 1 wherein said recesses are triangular.

10. Sealing tool according to claim 1 wherein said recesses are rectangular.

11. Sealing tool according to claim 1 wherein said recesses cause the formation of many small sealing points between the container and lid in the region of the tearing-open tab during operation of the sealing tool.

* * * * *